Figure 1:
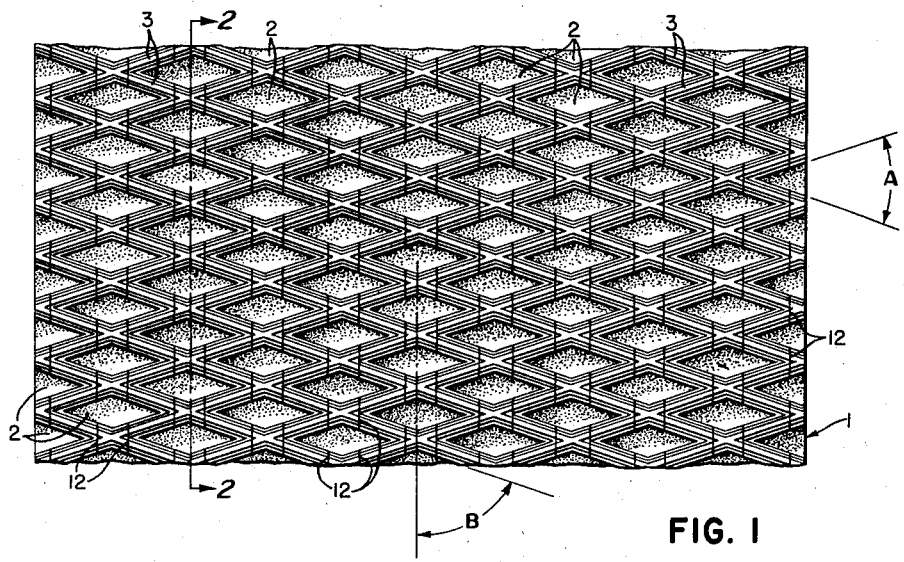

Oct. 20, 1959  S. A. TAYLOR  2,909,271
CONVEYOR BELT
Filed Sept. 24, 1956

INVENTOR.
STEPHEN A. TAYLOR
BY
R. L. Miller
ATTORNEY

United States Patent Office 2,909,271
Patented Oct. 20, 1959

2,909,271

CONVEYOR BELT

Stephen A. Taylor, Cuyahoga Falls, Ohio, assignor to The Goodyear Tire & Rubber Company, Akron, Ohio, a corporation of Ohio Application September 24, 1956, Serial No. 611,445

3 Claims. (Cl. 198—198)

This invention relates to belts and more particularly to belts for use in carrying objects on the surface, such as for example cartons, boxes, bags, sacks, etc.

With the mechanization of industry and the tremendous volumes of product handled, it has become increasingly difficult in many instances to provide satisfactory material handling equipment. Conveying of material up steep inclines requires not only a good gripping surface on the belt but also a durable and self cleaning one in order to be economically feasible and practical. There have been many types of roughened belt surfaces manufactured over the years with a great number of them being unsatisfactory and many others that are initially satisfactory soon lose much of their gripping power due to wear of the surface.

Many of these belt surfaces are formed with a symmetrical design of some type with projections forming the design. This was accomplished by either grooving an extra thick belt cover or molding or fastening projections on the belt surface in the predetermined pattern. This formed a design created by continuous grooves or recesses. Such belts were not only expensive to manufacture but also did not have a surface with sufficient gripping action for many operations. It is therefore an object of this invention to provide a rough top conveyor belt with a very durable and very high gripping power load carrying surface.

Another object of the invention is to provide a new and novel belt surface.

A further object of this invention is to provide a belt that is attractive in appearance and substantially self cleaning to preserve its efficiency.

A still further object of this invention is to provide a belt surface that retains substantially the same gripping power throughout its life.

Other objects and advantages of this invention will become apparent hereinafter as the description thereof proceeds, the novel features, arrangements and combinations being clearly pointed out in the specification as well as the claims thereunto appended.

Figure 2:
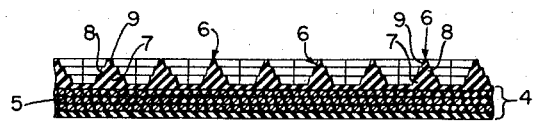
Figure 3:
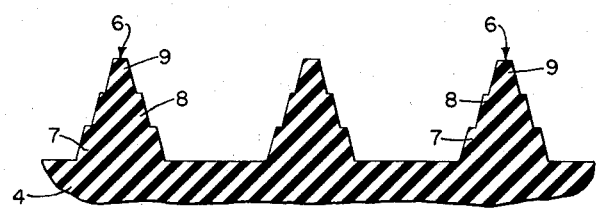
Figures 4, 5:

In the drawings:

Fig. 1 is a plan view of a portion of a belt;
Fig. 2 is a section taken on 2—2 of Fig. 1;
Fig. 3 is an enlarged partial section;
Fig. 4 is an enlarged section of a modification of the invention; and
Fig. 5 is an enlarged section of a further modification of the invention.

In Figs. 1 and 2 a package conveying belt 1 is shown with a load carrying surface of diamond-shaped depressions 2. The belt 1 runs in the direction indicated by the arrow so that the major axes of the diamond depressions are substantially transverse to the longitudinal centerline of the belt. As shown, the diamond depressions 2 are formed by a series of intersecting projecting ribs 3 extending at an angle across the belt. Preferably, the ribs 3 are divided into two sets, with each set extending across the belt at substantially similar angles with respect to the longitudinal centerline of the belt, but the ribs of one set being opposite to those of the other set. The sets of ribs intersect so that the diamond depressions are formed by continuous ribs as opposed to a surface design created by spaced projections on the belt surface. The last mentioned surface is, in effect, one created by a series of continuous grooves or spaces with the projections being non-continuous.

The belt 1 is of conventional construction having a carcass 4 of any of the well known constructions such as several plies 5 of woven fabric or several plies of cord fabric. Such constructions are well known and the particular construction depends upon the specific requirements of the installation for which the belt is to be made. A layer of rubber or rubber-like material containing sufficient volume to form the ribs 3 during the vulcanization of the belt is applied to the upper surface of the belt. The belt is then vulcanized in accordance with the usual practices such as in a platen press with a plate having the desired configurations formed therein or on a continuous rotary type of cure in which the drum against which the belt is urged, contains a design of the desired configuration.

It has been determined that if the acute angle A formed by the intersecting ribs lies between 20 and 50° (the apex of the diamond depressions), that a very satisfactory gripping power is provided by the belt surface. This means that each rib, if symmetrically aligned with respect to the longitudinal centerline, will form an acute angle B of 65 to 80° therewith. Preferably, each set of ribs should form substantially the same angle with the centerline of the belt so that the belt will run true over the pulleys, particularly where the carrying surface of the belt is trained over idlers on the return run. It is essential that the length of the diamond extend generally transverse of the belt to attain the maximum performance, although it is not necessary that the angle of each set of ribs with respect to the centerline be identical although the appearance of a symmetrical belt is more pleasing.

A cross section for the ribs 3 as shown in Figs. 2 and 3 has been found to provide a very excellent belt surface. The individual ribs 6 of each set are formed of symmetrically stacked truncated isosceles triangle sections 7, 8 and 9, each of the sections becoming progressively smaller as the distance from the carcass or body surface increases. The upper edges of the outermost sections 9 of each of the ribs engage the article being carried on the belt and effectively grip the same.

Figs. 4 and 5 illustrate other cross sectional forms of the rib structures which may be used to provide a good gripping surface. The rib 10 as shown in Fig. 4 is a triangular section with a small portion of the apex of the triangle removed. The shape of the rib 11 shown in Fig. 5 is that of a full triangle. In either modification, the layout of the ribs on the belt surface is similar to that shown and described in connection with Fig. 1.

Irrespective of the particular rib sectional shape, in order to present a substantially uniformly flexible surface across the width of the belt, each rib is slit (Fig. 1) immediately adjacent on each side of the rib intersections with the slit running in a direction substantially parallel to the length of the belt. The slits 12, thus formed, permit the intersecting portions of the ribs to flex freely in a direction parallel to the centerline of the belt so that the flexibility of these sections is comparable to the slightly longer sections of the ribs that extend between the slits 12. The slits 10, for example, may be cut with a knife or series of knife blades after vulcanization, or they may be molded in the belt surface by means of insert blades in the mold used to form the belt surface. The slitting of rubber articles is a common expedient and many methods of slitting are used that could be adapted to slitting the ribs of the belt. Preferably, the slits are formed to a depth substantially equal to that of the rib height so as to provide flexibility throughout the entire height of the rib. This will give good gripping power until the ribs are practically worn off the belt.

In the rib structure shown in Figs. 2 and 3, as the belt wears through one section, the section below forms another rib for the belt surface. The stepped sections also stabilize the ribs so that they do not fold back completely and become less effective to grip or "bite" because of this folding. The larger sections immediately below form a stable base for the sections above and assist in localizing the flexing so that the rib is more effectively urged into contact with the article carried on the belt.

If the major axes of the diamonds do not extend substantially transverse of the belt, then the ribs, though slit, lack substantially uniform flexibility across the belt. This will cause concentrated wear in certain sections because the more flexible sections will not materially assist in holding the article so that practically the entire load of the article will be carried by the more rigid sections. This will cause non-uniform wear and subsequently the belt surface will not properly function in carrying articles thereon.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A conveyor belt having a material engaging surface formed of projecting ribs which comprises two sets of ribs, each set including a multiplicity of substantially parallel projecting ribs extending across the width of the belt surface at an angle with respect to the centerline of the belt, each rib having a stepped down cross-section in the form of a series of stacked and symmetrically aligned truncated isosceles triangle sections, the sections becoming progressively smaller as the distance from the belt surface increases and the angle of the ribs of each set being substantially equal but in opposite directions with respect to the centerline and the ribs of each set intersecting the ribs of the other set to form diamond-shaped depressions between the intersecting ribs, with the major axes of the diamonds extending transversely of the belt and slits in each rib extending longitudinally of the belt and symmetrically spaced on each side of each rib intersection and of a depth substantially that of the ribs, whereby the ribs are divided into a series of flexible segments to provide a gripping surface.

2. A conveyor belt having a material engaging surface comprising one set of ribs having a multiplicity of substantially parallel projecting ribs extending across the width of the belt surface at an included acute angle of 65° to 80° with respect to the centerline of the belt and a second set of similar ribs extending across the belt surface at substantially the same angle with respect to the centerline of the belt but in the opposite direction to those of the first set of ribs, each rib of each set having a similar cross-section with the greatest cross-section width adjacent the belt surface and the smallest cross-section width at its outer edge, and the ribs of each set intersecting the ribs of the other set to form diamond-shaped depressions between the intersecting ribs, with the major axes of the diamonds lying substantially normal to the centerline of the belt and slits in each rib extending longitudinally of the belt and symmetrically spaced on each side of each rib intersection and of a depth substantially that of the ribs, whereby the ribs are divided into a series of flexible segments to provide a gripping surface.

3. A conveyor belt having a material engaging surface comprising one set of ribs having a multiplicity of substantially parallel projecting ribs extending across the width of the belt surface at an included acute angle of 65° to 80° with respect to the centerline of the belt and a second set of similar ribs extending across the belt surface at substantially the same angle with respect to the centerline of the belt but in the opposite direction to those of the first set of ribs, each rib of each set having a stepped-down cross-section in the form of a series of stacked and symmetrically aligned similar shaped sections with the sections becoming progressively smaller as the distance from the belt surface increases, and the ribs of each set intersecting the ribs of the other set to form diamond-shaped depressions between the intersecting ribs, with the major axes of the diamonds lying substantially normal to the centerline of the belt and slits in each rib extending longitudinally of the belt and symmetrically spaced on each side of each rib intersection and of a depth substantially that of the ribs, whereby the ribs are divided into a series of flexible segments to provide a gripping surface.

References Cited in the file of this patent

UNITED STATES PATENTS

| | | |
|---|---|---|
| 933,110 | Rempes | Sept. 7, 1909 |
| 2,477,960 | Caldwell | Aug. 2, 1949 |
| 2,784,835 | Dixon | Mar. 12, 1957 |

FOREIGN PATENTS

| | | |
|---|---|---|
| 6,806 | Great Britain | 1900 |
| 991,280 | France | June 20, 1951 |
| 1,094,880 | France | Dec. 15, 1954 |